United States Patent [19]

Brunton et al.

[11] Patent Number: 4,798,737

[45] Date of Patent: Jan. 17, 1989

[54] PELLETIZATION OF LOW-TITER LIPIDS

[75] Inventors: Ellis W. Brunton; Denver J. Haynes, both of Wilkesboro; William M. Ross, Jr., Moravian Falls, all of N.C.

[73] Assignee: Balanced Energy Company, Wilkesboro, N.C.

[21] Appl. No.: 35,609

[22] Filed: Apr. 7, 1987

[51] Int. Cl.$^4$ .............................................. A23D 3/00
[52] U.S. Cl. .................................... 426/602; 426/465; 426/647; 426/656; 426/807
[58] Field of Search ............... 426/647, 801, 601, 602, 426/573, 575, 454, 455, 456, 656, 805, 465

[56] References Cited

U.S. PATENT DOCUMENTS

| | | | |
|---|---|---|---|
| 2,403,547 | 7/1946 | Peschardt | 426/103 |
| 3,093,483 | 6/1963 | Ishler et al. | 426/274 |
| 3,455,701 | 7/1969 | Miller et al. | 426/575 |
| 3,658,550 | 4/1972 | Hawley | 426/574 |
| 3,919,435 | 11/1975 | Feldbrugge et al. | 426/574 |
| 3,925,560 | 12/1975 | Scott et al. | 426/807 X |
| 3,939,290 | 2/1976 | Terada et al. | 426/602 |
| 4,042,718 | 8/1977 | Rawlings et al. | 426/807 X |
| 4,098,913 | 7/1978 | Baugher | 426/104 |
| 4,145,452 | 3/1979 | Cousin et al. | 426/321 |
| 4,242,364 | 12/1980 | Buddemeyer et al. | 426/98 |
| 4,251,547 | 2/1981 | Liggett | 426/1 |
| 4,348,418 | 9/1982 | Smith et al. | 426/104 |
| 4,362,748 | 12/1982 | Cox | 426/512 |
| 4,404,228 | 9/1983 | Cloosterman et al. | 426/98 |
| 4,446,055 | 5/1984 | Shah et al. | 426/602 |
| 4,603,054 | 7/1986 | Schmidt et al. | 426/574 |

FOREIGN PATENT DOCUMENTS

| | | |
|---|---|---|
| 57-19671 | 2/1982 | Japan . |
| 57-69262 | 4/1982 | Japan . |
| 0138346 | 8/1983 | Japan .................................. 426/575 |
| 02255 | 6/1984 | World Int. Prop. O. .......... 426/575 |

OTHER PUBLICATIONS

Bailey's Industrial Oil and Fat Products Fourth Edition John Wiley et Sons publishers (1980) pp. 376, 391-392 & 595-597.

Hawley "The Condensed Chemical Dictionary" Tenth Edition Van Nostrand Reinhold Co. Publishers (1982) pp. 30, 450 & 932.

Whistler "Industrial Gums Polysaccharides & Their Derivatives" Academic Press (1959) pp. 55-82.

J. D. Shroder, "Dry" Fat Update, Sep., 1982, No. 152, Director's Digest.

Primary Examiner—R. B. Penland
Attorney, Agent, or Firm—Bell, Seltzer, Park & Gibson

[57] ABSTRACT

A method of forming solid pellets from lipids which are normally liquid or semi-solid at ambient temperatures is disclosed. A suspension of a coagulant in a lipid is formed. Water is admixed to form an emulsion which is then separated into discrete portions. The discrete portions are contacted with a hardening agent and then dried under controlled conditions to form the resulting solid pellets which can contain up to 95 percent or more of the lipid.

29 Claims, No Drawings

PELLETIZATION OF LOW-TITER LIPIDS

FIELD OF THE INVENTION

The present invention is related to co-pending application Ser. No. 609,541, filed Nov. 29, 1983, abandoned, for "Lipid Pelletization Methods, Apparatus and Products", which has been assigned to the common assignee of the present invention.

The invention relates generally to improved methods for forming low-titer lipids, i.e. those that tend to be either liquids or semi-solid at ambient temperatures, into discrete pellets which contain predominantly the lipid and which are dry enough and firm enough to be packaged, stored, handled and distributed as solid pellets in conditions under which the lipids normally would be liquid or semi-solid.

BACKGROUND OF THE INVENTION

Lipids are an essential part of the diet and metabolism of humans and animals. Although there exist a number of potentially desirable reasons for developing novel methods of delivering lipids to humans, in the field of animal nutrition a rather intense need exists to supply lipids as part of animal feed rations. Specifically, the desirability of lipids stems from their efficient supply of energy density in animal feeds. With the growth of programmed feeding for large numbers of specific types of animals, difficulty has arisen in supplying appropriate types and amounts of lipids. For example, adding certain types of lipids to the diets of dairy cattle significantly enhances their milk production, and other animals exhibit similar growth and health enhancement when the lipid content of their diets is increased.

The term "lipid" refers to fats and fat-derived materials, among other compounds. It includes substances which are relatively insoluble in water, but soluble in typical organic solvents; which are actually or potentially related to fatty acid esters, fatty alcohols, sterols, waxes and the like; and which are utilizable by animal organisms. Lipids are one of the chief components of living cells. Accordingly, as used herein, the term lipid can include various fats, fatty acids, fatty esters, and oils.

A number of such compounds which are unappetizing or inappropriate for use in foods intended for human consumption are nevertheless quite satisfactory and desirable for use as part of animal diets. Such lipids can include the used oils and fats from various cooking processes, such as that referred to as "yellow grease", tallow, poultry oils, fish oils, other animal by-products, as well as oils of vegetable origin.

Although desirable for use in animal feed rations, many of these materials are "low-titer" lipids, meaning generally that they are either semi-solid or liquid at ambient temperatures. Typically, lipid compounds which are referred to as fats are generally solid at ambient temperatures and those which are referred to as oils are generally liquid under the same conditions. As used herein, the phrase "ambient temperatures", is used in its common meaning, for which the term "room temperature" may also be used, to refer to temperatures of between about 20° and 25° Celsius, or 68°–77° Fahrenheit.

Accordingly, any system for including such desirable lipids in the diet of animals has heretofore required some system for transporting, distributing, mixing, and feeding liquids or semi-solid materials. As might be expected, the liquid or semi-solid nature of these materials raises a number of difficulties. For example, distributing liquid or semi-solid materials to animals can be quite difficult compared to distributing dry ingredients given the relatively high viscosities of such materials.

Additionally, when mixed with grains and similar dry feed products, the temperature sensitive lipids also tend to clump, solidify, or otherwise agglomerate, and to disperse nonuniformly through the feed products with which they are mixed.

The nutritional value of lipids to animals and the aforementioned difficulties in handling lipids have led the feed industry to significant expenditures of time and money in attempts to develop systems suitable for mass distribution of lipids in foods or as food supplements.

Previous techniques have included using edible, absorbent host carriers, e.g. grain products, to add lipids to animal feeds. Although this does represent one method of delivering lipids, certain problems remain. For example, the carrier material will very likely be suitable only for certain animal species. The problems of stability, rancidity and handling tend to remain. Often, the carrier tends to comprise well over fifty percent of the weight and bulk of any resulting food product, limiting the amount of lipid that can be included and increasing the cost of distribution of the material.

Other delivery techniques have included forming lipids into powders, an example being the typical dry artificial creamer for hot beverages such as coffee. More recent developments have included encapsulating lipids in a shell formed from a protein and aldehyde complex. These particles have, however, failed to gain commercial acceptance, one reason being that the aldehyde constituents tend to be known carcinogens, and the resulting products cannot be approved for use as animal feed supplements. Other delivery techniques carry lipids in gelatin-type products which rely on the interaction of alginates with various metal salts to produce soft-gelled products.

Nevertheless, despite the efforts of a large number of researchers over a prolonged period of time, there remained no simple, economical system for delivering a lipid, either per se or in extremely high lipid concentration particles, in integral, stable, solid, and highly concentrated form.

Recently, however, and as disclosed in co-pending application Ser. No. 609,541; to James P. Cox; "Lipid Pelletization Methods, Apparatus and Products"; filed Nov. 29, 1983 and assigned to the assignee of the present invention, there has been disclosed a method of forming integral, firm, solid, "dry" pellets or particles of lipids per se containing up to 95 percent or higher lipid concentrations, less water of hydration.

The process disclosed by Cox results in a solid pellet or particle which is integral, generally solid, and contains lipid throughout its entire structure. The pellets are stable over the temperature ranges required for handling and distribution in agricultural situations and unlike any previous lipid delivery system, the pellets can be bagged for storage and transportation with relatively long shelf life and attendant convenience to the end users.

In the Cox process, the pelletized lipids are prepared according to the following scheme: (1) a suitable mixture of water and alginate is formed and then, if necessary, heated to a temperature above which the particular lipid to be included exists in a liquid phase; (2) the liquid or liquified lipid is added to the aqueous mixture of the alginate to form a alginate-water-lipid emulsion; (3) the emulsion is thereafter extruded or otherwise deposited in discrete amounts into a metal salt bath, usually an aqueous solution of calcium chloride (CaCl$_2$). The calcium chloride sets the emulsion in the configuration in which it was extruded; and (4) the resulting pellet is maintained in the metal salt bath for a sufficient length of time to ensure a desired firmness of the product, after which the particles may be dried, packaged, or mixed with other feed materials as desired.

As suitable proportions, Cox suggests mixing water, alginate and yellow grease into an emulsion containing about 57% water, about 41% yellow grease, and about 0.5% alginate, all by weight, with the remainder being additional emulsifying agents or such as "ammonia (NH$_3$)" or a "coagulant expander" such as bentonite. This mixture is extruded into a one percent (1%) solution of calcium chloride and allowed to remain for approximately 10 minutes. The resulting pellets are spread out to dry under ambient conditions for 24 hours, after which they exhibit a moisture content of about 30%.

Although the Cox process results in a pellet which contains predominantly lipids and which demonstrates the potential for delivering such pellets as a part of an animal feed ration, mixing the characteristically hydroscopic alginate directly with water results in a gel-like mixture which is difficult to handle efficiently, even if ultimately useful. As a result, the process has generally been difficult to master on a production level basis.

As a first difficulty, alginates are extremely hydroscopic and forming the initial mixture of water and alginate in the manner described by Cox tends to be rather difficult. The water and the alginate mixture becomes extremely viscous and hard to handle. Second, mixing the high viscosity water-alginate mixture with a lipid to form the emulsion necessary to the process can be quite difficult.

Furthermore, the gel-like, viscous nature of the water-alginate mixture makes it difficult to form homogeneous mixtures with larger proportional amounts of lipid. Therefore, from a practical standpoint, forming an emulsion which carries a high enough proportion of lipid to form a resulting pellet carrying a correspondingly high proportion of lipid to quite difficult using the Cox process.

Accordingly, the order of operations called for by Cox tend to be rather time-consuming, difficult, and proportionally limiting, making them more problematic to use on a production scale.

Secondly, the techniques set forth by Cox for drying the pellets have presented difficulty on a production level basis. Absent appropriate drying (other than water of hydration), "watery" pellets present many of the storage and handling problems that liquid or semi-solid lipids presented in the first place.

More specifically, although the various processes discussed in Cox's application refer to "dry" pellets, it should be understood that the production of dry pellets as discussed therein tends to proceed in two stages: first, the production of a "hardened" discrete portion of emulsion—e.g. a pellet—which can be described as "dry" in that any lipids present are no longer in a liquid state. Second, the production of a pellet from which some additional amount of water has been removed and which is "dry" or "drier" or "dried" in that it carries a smaller precentage of moisture.

The Cox disclosure generally discusses several methods of accomplishing the process of removing additional water from such pellets: a rotatable drying cylinder operated under ordinary atmospheric conditions; "conventional" methods of heating the pellets or heating the pellets with a "low, very dry and/or pulsating heat." Alternatively, Cox suggests that any active drying step may simply be unnecessary, or that the pellets will give up water in the presence of admixed grain products, which are generally initially drier than the pellets.

In production quantities and under production conditions, however, it has now been determined that active removal of some water content from the hardened pellets is almost always at least desirable, and often necessary to produce a satisfactory marketable pellet. Additionally, the mere exposure of the pellets to air, either with or without mechanical agitation results in unsatisfactory drying at production levels. Furthermore, conventional active heating techniques undesirably destabilize the pellets unless a significant amount of moisture has first been removed through some other technique. Finally, the amount of moisture which will migrate from the pellets to an admixed grain is not satisfactory for drying just-hardened pellets.

Accordingly, it is an object of the present invention to provide an improved method for forming lipids into stable pellets or particles.

It is another object of the invention to provide improved techniques for drying pelletized lipids, especially those formed according to the present invention.

The foregoing and other objects, advantages and features of the invention and the manner in which the same are accomplished will become more readily apparent upon consideration of the detailed description of the invention, which sets forth preferred and exemplary embodiments.

SUMMARY OF THE INVENTION

The invention comprises a method of forming low-titer lipids, particularly fats and oils, which are generally liquid or semi-solid at ambient temperatures, into pellets which remain solid and chemically stable at ambient temperatures and above, and which pellets predominantly contain lipid material. The method comprises admixing a liquid lipid and a coagulant to form a suspension of the coagulant in the liquid lipid. Thereafter, water is admixed to the suspension of lipid and coagulant to form an emulsion of water, lipid and the coagulant, thereby hydrating the coagulant following its mixture with the lipid. The emulsion is separated into small discrete portions, and a hardening agent is added to each of the discrete separated portions of the emulsion so that the discrete portions of the emulsion will be hardened into solid pellets or particles containing predominantly the lipid material.

Furthermore, the invention comprises an unexpectedly successful method of drying the hardened pellets formed according to the present invention by carefully exposing the pellets to controlled, yet relatively moderate, conditions of temperature, humidity and air current velocity which result in pellets more stable than those dried in ambient air or under active heating conditions.

DETAILED DESCRIPTION

As set forth in the summary, it has now been discovered that by initially forming a suspension of a coagulant in a lipid, the disadvantages of forming and handling an alginate and water solution can be avoided. It has been discovered according to the present invention that certain coagulants which are particularly advantageous can be mixed with the liquid lipid much faster than they can with water. The resulting lipid-coagulant suspension forms an emulsion much more quickly when water is added than does the mixture of coagulant and water when lipid is added. The increased speed in forming the emulsion from which the pellets are extruded and hardened offers significant advantages in time, energy and other engineering factors in commercial production of such pellets.

The term "coagulant" refers to compounds, often natural products, which cause an irreversible combination or aggregation of particles, including semisolid particles such as fats or proteins, to form a clot or mass.

Appropriate coagulants include certain natural polysaccharides, carbohydrates and carbohydrate-related compounds. Among these, Cox has suggested that alginates and pectins are useful and that alginate is preferred.

As used herein, the term "alginate" refers to derivatives of alginic acid, e.g. the sodium or potassium salts thereof. They are hydrophilic colloids obtained from seaweed. Sodium alginate is water soluble, that calcium alginate is insoluble.

In preferred embodiments of the invention, a liquid lipid such as poultry oil or yellow grease is mixed with alginate to form a suspension of alginate in the liquid lipid. If the lipid is semisolid at ambient temperatures, it may be warmed until it liquifies. Water is added to the suspension and the suspension agitated to form an emulsion, which is then separated into small discrete portions. One typical method of separating the emulsion into discrete portions includes extruding the emulsion through an extruder head and cutting off small portions of the extruded emulsion.

Following extrusion and separation into discrete portions, a hardening agent is added to each of the discrete separated portions to harden them into solid pellets or particles containing predominantly the lipid material. Preferred hardening agents comprise divalent metal cations, and the most preferred divalent metal cation is calcium ion. In a preferred embodiment, the emulsion is extruded from the extruder head directly into a bath of an aqueous calcium chloride solution.

In particular embodiments, the lipid and the alginate are admixed with one another in a weight ratio of between about 0.4 percent and 2.5 percent by weight alginate based on the amount of lipid used, with a most preferred ratio being about 1 percent alginate. Larger proportions of alginate results in an emulsion which is too viscous to be conveniently handled on a production basis and in pellets which contain so much coagulant that they tend to literally squeeze the lipids out of themselves, thus raising the storage and handling problems which properly formulated pellets help avoid. Alternatively, smaller proportions of alginate result in pellets which fail to exhibit desired hardness and stability characteristics.

Once the lipid and alginate are formed in suspension, water is admixed in a ratio, based on volumes of water and lipid, of between about 10:1 to 1:3, water to suspension, with the most preferred mixtures having volume ratios of between about 3:1 and 1:1, water to suspension. Greater amounts of water tend to lower the percentage lipid content in the resulting pellets, while greater amounts of lipid tend to result in pellets which undesirably exude lipids. Although applicant does not wish to be bound by a particular theory, it is presently believed that when the lipid-alginate suspension and water are mixed to form the emulsion, the suspended alginate becomes hydrated and dissolves in the water. Because alginate is the coagulant for the resulting pellets, there must accordingly be enough water in the emulsion to thoroughly and evenly distribute the hydrated, dissolved alginate throughout the emulsion.

In a most preferred embodiment, about one part by weight of alginate is admixed with about 99 parts by weight of the lipid to form the alginate lipid suspension, following which water is added in an amount of about 1 part by volume water to between about 1 in 2 parts by volume of the suspension. Emulsions containing about 55 percent lipid and about 45 percent water appear to be most preferred.

Although the theory underlying the present invention is not necessary to a complete understanding of the invention, and applicant does not wish to be bound by any such theory, the success in forming emulsions more quickly from suspensions of coagulants in lipids to which water is added (as compared to emulsions formed from aqueous solutions of coagulants to which lipid is added) is believed to result from the improved hydration of the coagulant which results from the invention's method of suspending the coagulant in the lipid. For example, as colloidal molecules with a strong affinity for water, alginates in mixtures acquire a tightly held film of water which is important in the stabilization of emulsions such as that formed in the method of the present invention. Therefore, when the alginates are mixed with the lipids, a suspension of the alginate results which maximizes dispersion of the alginate. When water is added, the suspended alginates are sufficiently available to hydrate and dissolve quickly, yet sufficiently dispersed to avoid agglomerating into the unweildy, if ultimately useful, gelatin-like mass characteristic of the process of the Cox application. Instead, a stable emulsion is easily and quickly formed, handled, separated into pellets, and hardened.

Additionally, and depending upon the intended feed use of the resulting pellets, additional emulsifying agents may be added to the lipid-alginate suspension. Ammonium hydroxide ($NH_4OH$) is suitable in amounts of between about 0.3 percent and 0.5 percent by weight, based on the amount of lipid, but tends to generate free ammonia ($NH_3$) under certain conditions. Sodium hydroxide (NaOH) and potassium hydroxide (KOH) added in similar proportions have been found to be particularly suitable for producing pellets which are beneficial to ruminant animals. Pellets produced using NaOH and KOH as additional emulsifying agents appear to possibly increase rumen bypass in ruminant animals and thus deliver more of the desirable ingredients of the feed rations to the latter stomachs of such animals.

Although applicant does not wish to be bound by any particular theory of rumen bypass, it appears that the NaOH and KOH may saponify some of the lipids in the suspension and in the resulting pellets which then exhibit the accompanying rumen bypass characteristics. For the same reason, NaOH and KOH can be unsuitable for use in pellets intended for certain nonruminant animals which cannot digest the saponified fats.

Further in accordance with the present invention, it has been discovered that the techniques of drying the pellets have a significant effect on their long-term stability. Accordingly, the method of the invention further comprises drying the hardened solid pellets to moisture contents of less than about 5 percent other than water of hydration. More preferred embodiments will be dried to moisture contents of less than about 3 percent other than water of hydration, and most preferred embodiments are dried until they have a moisture content of less than about 2 percent, other than water of hydration.

It has been found according to the invention that rather than active heating or totally passive drying of the pellets, particularly successful methods for drying the pellets instead include exposing the pellets to an air current having controlled conditions of moderate temperatures and relative humidities. Accordingly, drying the pellets for indeterminate periods of time at ambient temperatures and a relative humidity of no more than about 50 percent will result in solid pellets which have a moisture content of less than about 10 percent other than water of hydration.

Exposing the pellets to air having a temperature of between about 60° and 70° F., and a relative humidity of between about 30 and 35 percent for a period of time of about three hours will result in pellets having a moisture content of less than about 3 percent other than water of hydration.

Where even lower water contents are desired, the method comprises exposing the pellets to air having a temperature of between about 65° and 70° F. and a relative humidity of between about 30 and 35 percent for a period of between about 12 and 24 hours. The solid pellets which result from this drying have a moisture content of less than about 2 percent other than water of hydration, and some exhibit water contents of as low as 1%, other than water of hydration.

More specifically, it has been discovered according to the present invention that the most successful drying techniques are nonconventional and comprise directing a current of controlled conditioned air over and through a number of the pellets. In particular, where the desired conditions of temperature (65°-70° F.) and relative humidity (30-35 percent) are maintained, the velocity of the air current and the number of pellets exposed to the air current should be selected so that the moisture which is transferred to the air current from the drying pellets raises the relative humidity of the air current to between about 90 and 100 percent.

Because about half of the energy requirements in the drying process result solely from the need to move the air, raising the relative humidity to between about 90 and 100 percent also results in the most efficient use of available energy. As also understood by those familiar with the treatment and conditioning of moving air, some evaporative cooling of the air current will be expected as the pellets dry. Because warmer air can carry more moisture than cooler air, in initial stages the air current may be started at 75° or 80° F. to prevent it from cooling below 65° or 70° F. too quickly.

It has unexpectedly been discovered according to the present invention that the majority of the drying of the pellets takes place as moisture near the surface of the pellets evaporates, following which moisture on the interior equilibrates toward the surface. Therefore, the velocity of the air current to which the pellets are exposed is as important a factor as are the temperature and relative humidity. If the velocity of air flow is too slow, the air current will become more saturated and equilibrium conditions will disfavor further drying. An overly rapid airflow wastes resources on a production level and prevents a maximum drying rate by lowering apparent temperature and decreasing the time during which a given volume of air is in contact with the pellets.

Additionally, it has been discovered that the pellets give up moisture more slowly as they become drier. Therefore, in order to enhance their drying, the velocity of the air current and the number of pellets exposed should be progressively correlated as the pellets become drier so that the moisture absorbed from the pellets continues to raise the relative humidity of the air current to about 90 percent.

In a preferred embodiment, the method of progressively correlating the velocity and the number of pellets comprises maintaining the air current at a constant static pressure and increasing the number of pellets through which the current flows. In this embodiment, the air current is directed over a layer of pellets and the method of progressively increasing the number of pellets comprises increasing the thickness of the layer of pellets over and through which the air current flows.

In the preferred embodiment, the air is conditioned to a temperature of 70° F. (21° C.) and a relative humidity of 35 percent. The static air pressure of the air current is maintained at about 0.5 inches of water. The thickness of the layer of pellets is initially maintained at about ¾ inch so that the corresponding air flow is about 150 feet per minute (fpm). The layer is continually made thicker, for example by moving drying pellets from faster moving conveyors to slower moving ones, until it reaches a thickness of about 6 inches, with a resulting air current velocity of about 50 fpm.

These examples are given for purposes of illustration rather than limitation, as the exact parameters can and should be adjusted to maximize the drying of pellets carrying various lipids and additives and intended for different end uses.

In using the pellets produced according to the present invention to form animal feed supplements, it has been further found that small amounts of proteinaceous or other materials can successfully be added to the various mixtures during the pelletization process to form pellets which have additional desirable qualities or which can deliver additional nutritional, medicinal, or other supplements to animals in a manner which could not otherwise be accomplished. Accordingly, a further aspect of the invention comprises adding proteinaceous material to the emulsion formed from the alginate, the liquified lipid and the water. In particular embodiments, the proteinaceous material comprises blood meal. In particular preferred embodiments, between about 1 and 10 percent by weight of blood meal or mixtures of blood meal are added to the emulsion prior to the step of extruding the emulsion into the calcium ion bath.

Amino acids can also be added to the pellets, preferably to their exterior surfaces, for example, by applying powdered crystalline amino acids to hardened pellets in a rotary applicator. Although crystalline amino acids can be added to the emulsion, because they are water soluble, the amino acids tend to migrate into the hardening bath resulting in dried pellets which contain less amino acids than were originally added.

Particles which result from such techniques predominantly contain lipid materals, i.e. they comprise between 80 and 90 percent by weight of a low-titer type lipid, and tend to be stable at temperatures as high as 120° F. The pellets contain up to about 2 percent by weight of a calcium alginate salt, and less than about 10 percent by weight water other than water of hydration.

The mixtures and drying techniques can be adjusted to additionally form pellets having between about 90 and 95 percent by weight of the lipid, up to about 1 percent of a calcium alginate salt, and no more than about 5 percent by weight proteinaceous material and less than about 2 percent by weight water other than water of hydration.

In another embodiment, the pellets can contain at least 95 percent by weight of the lipid, up to about 1 percent of the calcium alginate salt, no more than about 2 percent of proteinaceous material, and only about 1 percent by weight water other than water of hydration.

It will be recognized by those familiar with foods and feed materials that moisture levels of 3 percent or less are extremely low for any type of food product, and thus additionally demonstrate the unexpected advantages of drying the lipid pellets according to the present invention. The low moisture content adds to the resulting commercial value of the pellets, because purchasers of feed products tend to disfavor paying for products having high weight proportions of moisture and resulting lower weight proportion of nutritive materials.

EXAMPLE 1

A lipid pellet formulation was prepared to facilitate the addition of fat to livestock and poultry rations in mixed feed operations, and which would provide an energy dense, nutritionally balanced diet. The lipid pellets were designed to replace the first and second limiting essential amino acids that would be removed when substituting fat pellets for corn in a ration, as well as to provide additional quantities of the essential amino acids in order to maintain an optimal amino acid to calorie ratio in a livestock ration. A 4.5 percent fat addition to a feed ration was made with fat pellets containing 90 percent fat, and formed as described below. One hundred pounds of corn were replaced in a ton of feed with 100 pounds of amino acid fortified fat pellets and without separate additions of protein-rich ingredients or synthetic amino acids.

In preparing the amino acid fortified fat pellets, yellow grease was used as the lipid starting material. The yellow grease was heated sufficiently to liquify it (about 98° F.) and about 1% by weight of a medium viscosity sodium alginate was added. The alginate and liquified yellow grease were mixed into a suspension using vigorous mechanical agitation. Approximately 5% blood meal was added to the suspension during mixing. A volume of water approximately equal to that of the yellow grease was added to the suspension and the mixture agitated to form an emulsion.

As described earlier herein, the emulsion was directed through an extruder head and sliced into roughly spherical discrete portions between about 1/16" and ¼" in diameter as it exited the head. The extruder head itself was submerged in an aqueous solution of calcium chloride so that the extruded discrete portions were immediately exposed to the hardening agent. After about 15 minutes in the bath, the resulting hardened pellets were removed from the bath, spread in layers about 4 inches thick and placed for about 12 hours in a room in which the temperature and humidity were controlled to remain between 65° and 70° F. and 30 and 35 relative percent, respectively.

The resulting pellets exhibited an approximate 2% moisture level. As a final step, further dry blood meal, L-lysine and D,L-methionine where added to the exterior of the pellets in a rotary mixer. This final product gives a proximal analysis of 4 percent protein and 90 percent fat.

The compositional formula for this pellet was:

| Ingredient | Percentage |
|---|---|
| Fat | 91.25 |
| Blood Meal | 5.50 |
| L-lysine | 0.05 |
| D, L-methionine | 0.10 |
| Alginate | 1.00 |
| Water | 2.10 |

OTHER EXAMPLES

Similar pellets were prepared from alternative lipids or mixtures of lipids. For example, pellets formed from 75 percent yellow grease and 25 percent soft tallow were prepared using the techniques described in Example 1. As used herein, "yellow grease" is a commercial term which refers to fats obtained from waste cooking oils, lards and similar materials. "Tallow" generally refers to animal fats having between sixteen and eighteen carbon atoms in their basic structure. Tallows are classified as "hard" and "soft" based on their higher and lower softening points, respectively.

Other similar pellets were successfully prepared from 100 percent hard tallow and mixtures of 50 percent hard tallow and 50 percent soft tallow, all according to the techniques of Example 1.

In all of the examples, analysis of the resulting pellets demonstrated that the chemical makeup of the lipids carried by the pellets was essentially identical to that of the lipids from which the pellets were formed, indicating that the method of the invention has no detrimental effect on the lipids being pelletized, and that desired lipids can be straightforwardly delivered in feed by using the present invention.

In the specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a method of forming solid pellets from low-titer lipids which are generally liquid or semisolid at room temperature, wherein an emulsion is formed of a coagulant present in an amount effective to induce coagulation in the presence of a hardening agent, water and a lipid, and the emulsion is then separated into discrete portions and the discrete portions are hardened by exposure to the hardening agent; the improvement comprising forming the emulsion by first admixing the coagulant and the lipid to form a suspension of the coagulant in the lipid; and then admixing the suspension with water.

2. A method according to claim 1 wherein the step of admixing the coagulant and the lipid comprises admixing an alginate with the lipid.

3. A method according to claim 2 wherein the step of admixing the alginate and the lipid comprises admixing between about 0.4 percent and 2.5 percent by weight of the alginate with the lipid.

4. A method according to claim 1 in which water is admixed with the suspension in a ratio by volumes of between about 10:1 and 1:3, water to suspension.

5. A method according to claim 1 in which water is admixed with the suspension in a ratio by volumes of between about 2:1 and 1:2, water to suspension.

6. A method according to claim 1 further comprising adding an emulsifying agent to the suspension of coagulant in the lipid.

7. A method according to claim 6 wherein the emulsifying agent is a hydroxide salt of a metal cation.

8. A method according to claim 6 wherein the emulsifying agent is selected from the group consisting of sodium hydroxide, potassium hydroxide and ammonium hydroxide.

9. A method of forming solid pellets from low-titer lipids, which are generally liquid or semisolid at room temperature, which pellets remain solid at room temperature and which predominantly contain lipid material, said method comprising:
(a) admixing the lipid and an effective amount of a coagulant that induces coagulation in the presence of a hardener to form a homogeneous suspension of the coagulant in the lipid;
(b) thereafter admixing water to the suspension of lipid and coagulant to form an emulsion of water, lipid and the coagulant, thereby hydrating the coagulant;
(c) contacting discrete portions of the emulsion with a hardener bath to thereby harden the discrete portions into solid pellets; and
(d) removing the hardened solid pellets from the hardener bath and drying them.

10. A method according to claim 9 wherein the step of admixing the lipid and the coagulant comprises admixing the lipid with an alginate.

11. A method according to claim 10 wherein the step of admixing the lipid and the alginate comprises admixing between about 0.4 percent and 2.5 percent by weight of the alginate with the lipid.

12. A method according to claim 9 wherein the step of admixing water comprises adding 1 part by volume water to between about 0.5 and 2 parts by volume of the suspension.

13. A method according to claim 9 wherein the step of contacting discrete portions of the emulsion with a hardener bath comprises extruding the discrete portions into an aqueous solution of a divalent metal ion salt.

14. A method according to claim 13 wherein the step of extruding discrete portions of the emulsion into an aqueous solution of a divalent metal ion salt comprises extruding discrete portions of the emulsion into an approximately 1 percent aqueous solution of calcium chloride.

15. A method according to claim 9 further comprising the step of adding between about 1 and 10 percent by weight of a proteinaceous material to the emulsion prior to the step of contacting discrete portions of the emulsion with a hardener bath.

16. A method according to claim 15 wherein the proteinaceous material comprises blood meal.

17. A method according to claim 9 further comprising adding amino acids to the surface of the hardened pellets.

18. A method of forming solid pellets from low-titer lipids, which are generally liquid or semisolid at room temperature, which pellets remain solid at room temperature and which predominantly contain lipid material, said method comprising:
(a) admixing the lipid and an effective amount of a coagulant that induces coagulation in the presence of a hardener to form a homogeneous suspension of the coagulant in the lipid;
(b) thereafter admixing water to the suspension of lipid and coagulant to form an emulsion of water, lipid and the coagulant, thereby hydrating the coagulant;
(c) extruding discrete portions of the emulsion into a hardener bath to thereby harden the discrete portions into solid pellets; and
(d) removing the hardened solid pellets from the hardener bath and drying them at ambient temperature at a relative humidity of no more than about 50 percent until the solid pellets have a moisture content of less than 5 percent, other than water of hydration.

19. A method according to claim 18 wherein the step of drying the hardened solid pellets comprises exposing the pellets to a current of ambient air having a relative humidity of no more than about 50 percent for a period of between about 4 and 5 hours.

20. A method according to claim 18 wherein the step of drying the hardened solid pellets comprises exposing the pellets to air having a temperature of between about 65° and 70° F., and a relative humidity of between about 30 and 35 percent until the solid pellets have a moisture content of less than 3 percent, other than water of hydration.

21. A method according to claim 18 wherein the step of drying the solid hardened pellets comprises exposing the pellets to air having a temperature of between about 65° and 70° F., and a relative humidity of between about 30 and 35 percent until the solid pellets have a moisture content of less than 2 percent, other than water of hydration.

22. A method of forming low-titer lipids into pellets or particles which remain solid at temperatures of at least about 120° F. and which predominantly contain lipid, said method comprising:
(a) admixing about 1 part by weight of an alginate and about 99 parts by weight of a lipid at a temperature sufficient to liquify the lipid, to form a homogeneous suspension of the alginate in the liquified lipid;
(b) thereafter admixing about one part by volume of water to about one part by volume of the suspension of lipid and alginate to form an emulsion of water, liquified lipid, and the alginate, thereby hydrating the alginate;
(c) adding between about 1 and 10 percent by weight of blood meal to the emulsion;
(d) extruding discrete portions of the emulsion into an aqueous solution of about 1 percent calcium chloride to thereby harden the discrete portions into solid pellets; and
(e) removing the hardened solid pellets from the calcium chloride solution and drying them in a flow of air having a temperature of between about 65° and 70° F., and a relative humidity of between about 30 and 35 percent until the solid pellets have a moisture content of about 3 percent or less, other than water of hydration.

23. A method according to claim 22 wherein the step of adding between about 1 and 10 percent by weight of blood meal comprises adding about 9 percent by weight of blood meal.

24. A method according to claim 22 wherein the step of adding between about 1 and 10 percent by weight of blood meal comprises, adding about 5 percent by weight of blood meal.

25. A method according to claim 22 further comprising adding amino acids to the surface of the hardened pellets.

26. A method according to claim 22 wherein the step of admixing an alginate and a lipid comprises admixing alginate and a lipid mixture which comprises about 75 percent by weight yellow grease and about 25 percent by weight soft tallow.

27. A method according to claim 22 wherein the step of admixing an alginate and a lipid comprises admixing alginate and a lipid mixture which comprises about 50 percent by weight hard tallow and about 50 percent by weight soft tallow.

28. A method according to claim 22 wherein the step of admixing an alginate and a lipid comprises admixing alginate and a hard tallow.

29. A method according to claim 22 wherein the step of admixing an alginate and a lipid comprises admixing alginate and yellow grease.

* * * * *

UNITED STATES PATENT AND TRADEMARK OFFICE
CERTIFICATE OF CORRECTION

PATENT NO. : 4,798,737

DATED : January 17, 1989

INVENTOR(S) : Ellis W. Brunton; Denver J. Haynes and William M. Ross, Jr.

It is certified that error appears in the above-identified patent and that said Letters Patent is hereby corrected as shown below:

Column 5, line 25, the word "that" should be --but--.

Signed and Sealed this

Eighteenth Day of July, 1989

Attest:

DONALD J. QUIGG

Attesting Officer

Commissioner of Patents and Trademarks